US010817458B2

(12) United States Patent
Qi et al.

(10) Patent No.: US 10,817,458 B2
(45) Date of Patent: Oct. 27, 2020

(54) BIDIRECTIONAL SIGNAL SEPARATION

(71) Applicant: Analog Devices International Unlimited Company, Limerick (IE)

(72) Inventors: Xin Qi, Cary, NC (US); Eric Stephen Young, Apex, NC (US); Chad Cosby, Carrboro, NC (US)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 16/141,308

(22) Filed: Sep. 25, 2018

(65) Prior Publication Data

US 2020/0097433 A1 Mar. 26, 2020

(51) Int. Cl.
*G06F 13/40* (2006.01)
*G06F 13/42* (2006.01)

(52) U.S. Cl.
CPC ................. *G06F 13/4282* (2013.01)

(58) Field of Classification Search
USPC .................................................. 710/105, 106
See application file for complete search history.

(56) References Cited

U.S. PATENT DOCUMENTS

| | | | |
|---|---|---|---|
| 5,689,719 A * | 11/1997 | Miura | G06F 11/0772 370/406 |
| 6,463,496 B1 | 10/2002 | Klein et al. | |
| 6,820,160 B1 * | 11/2004 | Allman | G06F 13/4072 710/305 |
| 7,808,277 B2 | 10/2010 | Rodriguez et al. | |
| 8,558,577 B1 | 10/2013 | Soriano Fosas et al. | |
| 2006/0075170 A1 * | 4/2006 | Behrendt | G06F 13/4291 710/110 |
| 2006/0265540 A1 * | 11/2006 | Mass | G06F 13/4068 710/305 |
| 2009/0028226 A1 * | 1/2009 | Bliss | G06F 13/4077 375/220 |
| 2010/0066409 A1 | 3/2010 | Rodriguez et al. | |
| 2010/0232484 A1 * | 9/2010 | Chiu | H04L 45/245 375/220 |

FOREIGN PATENT DOCUMENTS

| | | |
|---|---|---|
| CN | 110941579 A | 3/2020 |
| DE | 102019006700 A1 | 3/2020 |
| JP | 2013-105284 A * | 5/2013 |

* cited by examiner

*Primary Examiner* — Ilwoo Park
(74) *Attorney, Agent, or Firm* — Schwegman Lundberg & Woessner, P.A.

(57) ABSTRACT

This disclosure describes techniques for extending a range of bidirectional bus communications through the use of a differential signal path. The disclosed techniques include first separating the bidirectional bus into first and second unidirectional buses that transmit and receive signals, respectively, and then communicating the signals from the first and second unidirectional buses over a differential signal path. The separation of the bidirectional bus into the first and second unidirectional buses is performed using logic circuitry that blocks or permits communication between a given one of the first and second buses and the bidirectional bus based on whichever one of the first and second buses becomes dominant first. If the logic circuitry determines that the first bus becomes dominant before the second bus, the logic circuitry permits communications between the first bus and the bidirectional bus and blocks communications between the second bus and the bidirectional bus.

20 Claims, 7 Drawing Sheets

BIDIRECTIONAL SIGNAL SEPARATION

FIELD OF THE DISCLOSURE

This document pertains generally, but not by way of limitation, to signal separation in a bidirectional communication system.

BACKGROUND

Electronic circuits and systems often communicate with each other via a communication link referred to as a "bus." A variety of bus architectures are well known. Simple buses use as few as two active wires, although they may include additional wires for other functions. For example, an inter-integrated circuit (I2C) bus consists of two communication wires, a serial data line (SDA) and a serial clock line (SCL).

I2C buses are used to provide communications between two integrated circuits (ICs), for example, two or more ICs on a printed circuit board (PCB) or ICs on different PCBs. The I2C bus also may be used as a network link between electronic systems, for example in automation or control system applications. Architectures like the I2C bus are relatively easy to implement but their applicability is limited to short range communications (e.g., less than 1.5 meters) due to the single-ended nature of the wires. Splitting each bidirectional I2C bus into two unidirectional buses allows the devices using the I2C bus protocol to communicate over greater distances by using a differential transceiver. Typical systems, though, lack the capability to efficiently, quickly, and at a minimal cost split the bidirectional signal into two unidirectional buses for this purpose.

SUMMARY OF THE DISCLOSURE

This disclosure describes techniques for extending a range of bidirectional bus communications (e.g., I2C bus protocol communications) through the use of a differential signal path. The disclosed techniques include first separating the bidirectional bus into first and second unidirectional buses that transmit and receive signals, respectively, and then communicating the signals from the first and second unidirectional buses over a differential signal path. The separation of the bidirectional bus into the first and second unidirectional buses is performed using logic circuitry that blocks or permits communication between a given one of the first and second buses and the bidirectional bus based on whichever one of the first and second buses becomes dominant first. If the logic circuitry determines that the first bus becomes dominant before the second bus, the logic circuitry permits communications between the first bus and the bidirectional bus and blocks communications between the second bus and the bidirectional bus.

In certain embodiments, a system is provided for converting a bidirectional bus to two unidirectional buses comprising a first bus that communicates data in a first direction and a second bus that communicates data in a second direction, the system comprising: first logic circuitry coupled to the first and second buses and configured to: determine that the first bus becomes dominant before the second bus; and generate an indication that communication is in the first direction based on the determination that the first bus becomes dominant before the second bus; and second logic circuitry, responsive to the first logic circuitry, being coupled to the bidirectional bus and configured to: allow communication between the bidirectional bus and the first bus based on the indication that communication is in the first direction; and block communication between the bidirectional bus and the second bus based on the indication that communication is in the first direction.

In certain embodiments, the first logic circuitry is further configured to trigger a change in the indication that communication is in the first direction when the first bus becomes recessive for a specified period of time.

In certain embodiments, the first logic circuitry comprises a timer circuit coupled to a logic element for generating the indication that communication is in the first direction, wherein the first bus is configured to transmit the data to an external device, and wherein the second bus is configured to receive the data from the external device.

In certain embodiments, the timer circuit is configured to: assert a signal that indicates that communication is in the first direction in response to detecting that the first bus becomes dominant; and delay clearing the signal in response to detecting that the first bus becomes recessive until the timer circuit reaches a specified value.

In certain embodiments, the first bus is configured to receive the data from an external device, wherein the second bus is configured to transmit the data to the external device, and wherein the first logic circuitry comprises first and second timer circuits coupled to a plurality of logic elements for generating the indication that communication is in the first direction.

In certain embodiments, the first and second timer circuits receive an indication that the first bus has become recessive, wherein the plurality of logic elements is coupled to the bidirectional bus, and wherein the plurality of logic elements is configured to: determine that the bidirectional bus has become recessive; determine that the bidirectional bus is slewing towards a recessive state; and generate an indication that the first bus has become recessive.

In certain embodiments, the plurality of logic elements is configured to trigger a change in the indication that communication is in the first direction based on determining that: the first timer circuit reaches a first specified value and the bidirectional bus becomes recessive; the first timer circuit reaches the first specified value and the bidirectional bus is determined to not be slewing towards the recessive state; or the second timer circuit reaches a second specified value greater than the first specified value.

In certain embodiments, the second logic circuitry blocks the communication between the bidirectional bus and the second bus by maintaining a value communicated on the second bus in an asserted state.

In certain embodiments, the first logic circuitry is configured to determine that the first bus becomes dominant when a logic value of the first bus becomes low; the first logic circuitry comprises a first NOR logic element having inputs coupled directly to the first bus, an output of a first latch and an output of a second latch, an input of the first latch being coupled to the first bus; the first NOR logic element has an output coupled to the first latch, an output of the first latch being coupled to the second logic circuitry via at least a timer circuit; and the first latch output generates the indication that communication is in the first direction.

In certain embodiments, the first logic circuitry comprises a second NOR logic element having inputs coupled directly to the second bus, an output of the first latch, and an output of the second latch, an input of the second latch being coupled to the second bus; the second NOR logic element has an output coupled to the second latch, an output of the second latch being coupled to the second logic circuitry via at least an additional timer circuit; the second logic circuitry comprises a first OR logic element and a third NOR logic element; the first OR logic element having inputs coupled to the bidirectional bus and to the indication generated by the first logic circuitry, an output of the first OR logic element being coupled to the first bus; and the third NOR logic element having inputs coupled to the second bus and to the indication generated by the first logic circuitry, an output of the third NOR logic element being coupled via a transistor to the bidirectional bus.

In certain embodiments, a method is provided for converting a bidirectional bus to two unidirectional buses comprising a first bus that communicates data in a first direction and a second bus that communicates data in a second direction, the method comprising: determining that the first bus becomes dominant before the second bus; generating an indication that communication is in the first direction based on the determination that the first bus becomes dominant before the second bus; allowing communication between the bidirectional bus and the first bus based on the indication that communication is in the first direction; and blocking communication between the bidirectional bus and the second bus based on the indication that communication is in the first direction.

In certain embodiments, the method includes triggering a change in the indication that communication is in the first direction when the first bus becomes recessive for a specified period of time.

In certain embodiments, the determination that the first bus becomes dominant before the second bus is performed using a timer circuit coupled to a logic element, wherein the first bus is configured to transmit the data to an external device, and wherein the second bus is configured to receive the data from the external device.

In certain embodiments, the timer circuit is configured to: assert a signal that indicates that communication is in the first direction in response to detecting that the first bus becomes dominant; and delay clearing the signal in response to detecting that the first bus becomes recessive until the timer circuit reaches a specified value.

In certain embodiments, the first bus is configured to receive the data from an external device, wherein the second bus is configured to transmit the data to the external device, and wherein the determining and generating steps are performed using first and second timer circuits coupled to a plurality of logic elements.

In certain embodiments, the first and second timer circuits receive an indication that the first bus has become recessive, wherein the plurality of logic elements is coupled to the bidirectional bus, and wherein the plurality of logic elements is configured to: determine that the bidirectional bus has become recessive; determine that the bidirectional bus is slewing towards a recessive state; and generate an indication that the first bus has become recessive.

In certain embodiments, the plurality of logic elements is configured to trigger a change in the indication that communication is in the first direction based on determining that: the first timer circuit reaches a first specified value and the bidirectional bus becomes recessive; the first timer circuit reaches the first specified value and the bidirectional bus is determined to not be slewing towards the recessive state; or the second timer circuit reaches a second specified value greater than the first specified value.

In certain embodiments, the method further includes blocking the communication between the bidirectional bus and the second bus by maintaining a value communicated on the second bus in an asserted state.

In certain embodiments, the method further includes determining, using first logic circuitry, that the first bus becomes dominant when a logic value of the first bus becomes low; wherein: the first logic circuitry comprises a first NOR logic element having inputs coupled directly to the first bus, an output of a first latch and an output of a second latch, an input of the first latch being coupled to the first bus; the first NOR logic element has an output coupled to the first latch, an output of the first latch being coupled to the second logic circuitry via at least a timer circuit; the first latch output generates the indication that communication is in the first direction; the first logic circuitry comprises a second NOR logic element having inputs coupled directly to the second bus, an output of the first latch, and an output of the second latch, an input of the second latch being coupled to the second bus; the second NOR logic element has an output coupled to the second latch, an output of the second latch being coupled to the second logic circuitry via at least an additional timer circuit; the second logic circuitry comprises a first OR logic element and a third NOR logic element; the first OR logic element having inputs coupled to the bidirectional bus and to the indication generated by the first logic circuitry, an output of the first OR logic element being coupled to the first bus; and the third NOR logic element having inputs coupled to the second bus and to the indication generated by the first logic circuitry, an output of the third NOR logic element being coupled via a transistor to the bidirectional bus.

In certain embodiments, a system for enabling differential signal communication for a device that uses a bidirectional bus is provided, the system comprising: a bidirectional signal separation device configured to convert the bidirectional bus to two unidirectional buses comprising a first bus that communicates data in a first direction and a second bus that communicates data in a second direction, wherein the bidirectional signal separation device comprises logic circuitry configured to: determine that the first bus becomes dominant before the second bus; generate an indication that communication is in the first direction based on the determination that the first bus becomes dominant before the second bus; allow communication between the bidirectional bus and the first bus based on the indication that communication is in the first direction; and block communication between the bidirectional bus and the second bus based on the indication that communication is in the first direction; and a differential signal transceiver coupled to the first and second buses provided by the bidirectional signal separation device for communicating data to and from the device over a differential signal pair.

This overview is intended to provide an overview of subject matter of the present patent application. It is not intended to provide an exclusive or exhaustive explanation of the inventive subject matter. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
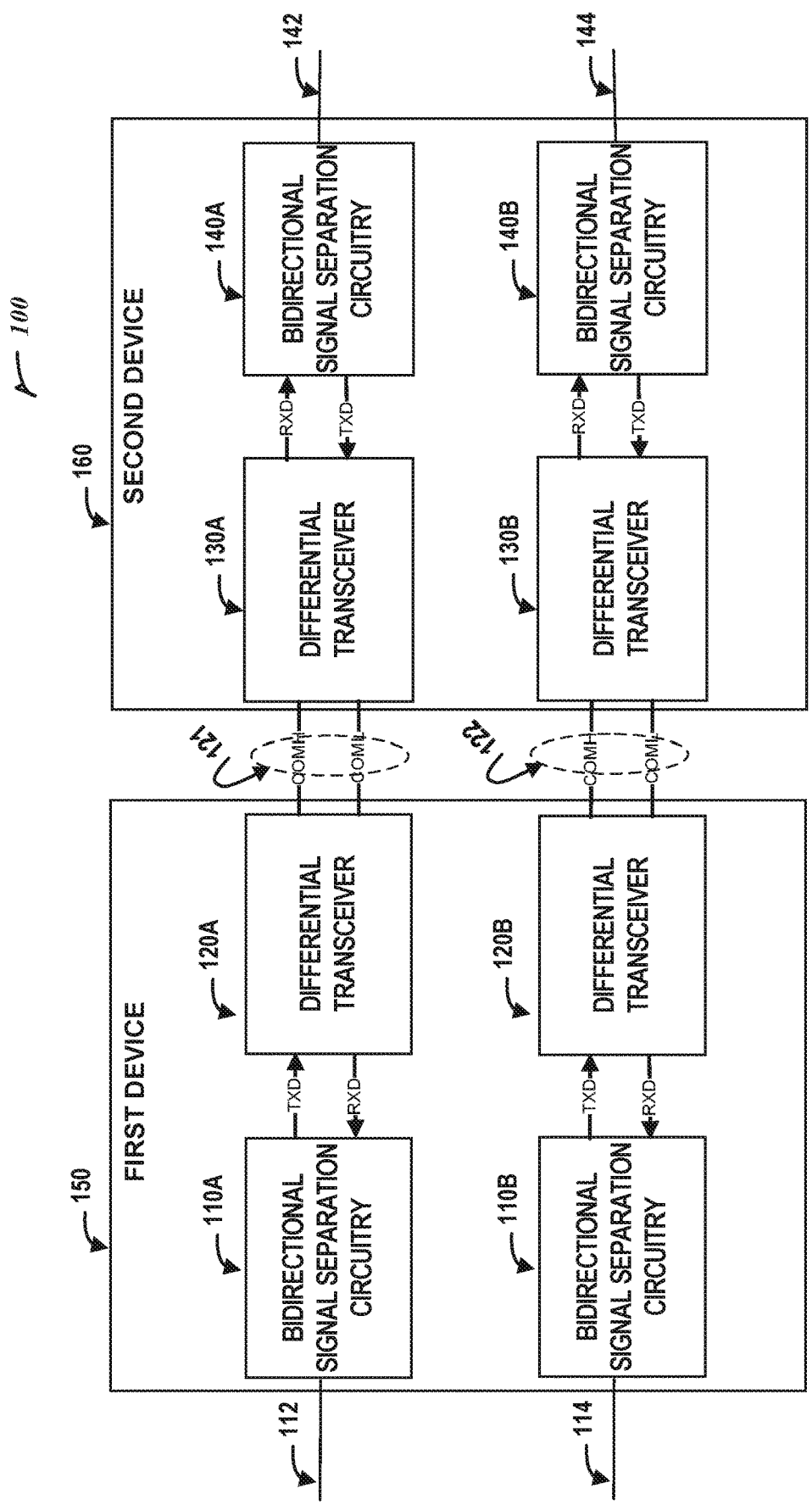
FIG. 1 is a block diagram of an example of differential signal communication system employing a bidirectional bus in accordance with various embodiments.

This disclosure describes, among other things, techniques to split a bidirectional bus (e.g., the I2C bus signals) into two unidirectional buses (e.g., receive and transmit buses) to enable devices that utilize bidirectional buses to communicate over greater distances (e.g., more than 1.5 meters). After splitting the bidirectional bus into the transmit and receive buses, data can be communicated between two or more devices using theses receive and transmit buses by way of a differential signal transceiver (e.g., a controller area network (CAN) transceiver). Given that differential signal buses are less sensitive to noise than single-ended buses, the data can be communicated between the devices over greater distances.

The below disclosure provides examples for splitting the bidirectional bus signals of the I2C bus protocol but can be similarly applied to any other bidirectional bus communications protocol.

According to the disclosed embodiments, in order to split the bidirectional bus into the two unidirectional buses, each bidirectional signal of the I2C bus protocol (e.g., the SCL and SDA buses) is provided to logic circuitry that separates the given bidirectional signal into two unidirectional buses. For example, the logic circuitry receives the SCL bus and splits the SCL bus into receive and transmit buses. One of the challenges of splitting a bidirectional bus into transmit and receive buses is knowing the direction of the data on the bidirectional bus. Namely, if data on the bidirectional bus is being communicated from a first device to a second, the data should be placed on the transmit bus of the first device and on the receive bus of the second device. Whereas data that is to be received on the bidirectional bus of the first device from the second device should be placed on the transmit bus of the second device and on the receive bus of the first device.

One known way to split the bidirectional bus into the transmit and receive buses involves a static offset method. This method compares precise voltages on the bidirectional bus to various threshold voltages using comparators and voltage references to determine the direction of communication on the bidirectional bus. The use of precise comparators and voltage references, though, is expensive, inflexible, and inefficient. This is because comparators and voltage references occupy a large amount of space relatively on a silicon device and the use of multiple closely spaced voltage thresholds on a single-ended bus (i.e., the bidirectional bus) reduces the noise immunity of the system.

Another known way to split the bidirectional bus into the transmit and receive buses requires measuring the direction of current on the bidirectional bus using a pull-up resistor internal to the integrated circuit (IC). However, this method also is expensive, inflexible, and inefficient. Particularly, the size of the pull-up resistor depends on the bus capacitance to ensure that rise and fall times meet the bus specification. Because this pull-up resistor is internal to the IC, its size has to be determined during a design phase of the IC, which limits the applicability of the method to devices having the bus capacitance for which the resistor was designed to handle. This increases the expense of designing the system and reduces its overall flexibility.

The described bidirectional signal separation techniques efficiently, quickly and at a minimal cost separate a bidirectional signal bus into transmit and receive buses. These techniques use logic circuitry combined with transistors to perform the signal separation, which occupies minimal space on a silicon device and can be flexibly applied in a wide range of situations. The way in which the direction of the signal path is determined, in order to control whether the bidirectional signal communicates with the transmit or receive buses, is based on a determination of which one of the transmit and receive buses becomes dominant first. Specifically, if the logic circuitry determines that the transmit bus becomes dominant before the receive bus, the logic circuitry permits communications between the transmit bus and the bidirectional bus and blocks communications between the receive bus and the bidirectional bus. On the other hand, if the logic circuitry determines that the receive bus becomes dominant before the transmit bus, the logic circuitry permits communications between the receive bus and the bidirectional bus and blocks communications between the transmit bus and the bidirectional bus.

According to the disclosed embodiments, to avoid the possibility of bus conflicts (e.g., due to a mistaken determination that a given one of the unidirectional buses is no longer communicating with the bidirectional bus), the logic circuitry employs one or more timer circuits. Particularly, the timer circuits are activated once the unidirectional bus, which is permitted to communicate with the bidirectional bus, becomes recessive. These timer circuits communicate with the logic circuitry to ensure that the logic circuitry continues permitting one unidirectional bus and blocking the other from communicating with the bidirectional bus until a given threshold period of time is reached.

According to the disclosed techniques, a unidirectional bus becomes dominant when a logic value of a signal on the bus is low, and the unidirectional bus becomes recessive when the logic value of a signal on the unidirectional bus is high. The disclosed techniques can be similarly applied to a system in which a bus becomes dominant when a logic value of a signal on the unidirectional bus is high and the unidirectional bus becomes recessive when the logic value of a signal on the unidirectional bus is low.

FIG. 1 is a block diagram of an example of differential signal communication system 100 employing a bidirectional bus in accordance with various embodiments. Differential signal communication system 100 includes a first device 150 and a second device 160. Although only two devices are depicted in differential signal communication system 100, any number of additional devices can communicate with the first device 150 and the second device 160 using the same techniques. Namely, first device 150 can be coupled to any number of devices using differential transceivers 120A and 120B.

The first device 150 includes bidirectional signal separation circuitry 110A and 110B. Each bidirectional signal separation circuitry 110A and 110B is coupled to a respective bidirectional bus 112 and 114 of the bidirectional bus protocol. For example, in the case of the I2C bidirectional bus protocol, bidirectional signal separation circuitry 110A is coupled to the bidirectional bus 112, which may be used to communicate SDA data of the I2C bidirectional bus protocol; and bidirectional signal separation circuitry 110B is coupled to the bidirectional bus 114, which may be used to communicate SCL data of the I2C bidirectional bus protocol.

For the sake of brevity and simplicity, an implementation of bidirectional signal separation circuitry 110A which communicates (receives and transmits) SDA signals of bidirectional bus 112 is provided below in connection with FIGS. 2 and 3, but similar implementations apply to any other bidirectional bus signals (e.g., SCL bus signals). In certain cases, only a single bidirectional bus is used in the differential signal communication system 100. In such circumstances, only one of the bidirectional signal separation circuitries 110A and 110B is used and needed by the first device 150 and the second device 160.

Bidirectional signal separation circuitry 110A splits or separates the bidirectional signal received from bus 112 into two unidirectional buses each communicating signals in a different direction (e.g., a transmit bus (TXD) and a receive bus (RXD)). Similarly, bidirectional signal separation circuitry 110B splits or separates the bidirectional signal received from bus 114 into two unidirectional buses each communicating signals in a different direction (e.g., a transmit bus (TXD) and a receive bus (RXD)). For example, the transmit bus represents data from the bidirectional bus 112 that the first device 150 sends to an external device (e.g., the second device 160) and the receive bus represents data that is received by the first device 150 from an external device (e.g., second device 160) to be placed on the bidirectional bus 112.

Each unidirectional bus generated by bidirectional signal separation circuitry 110A/B is provided to a differential transceiver 120A/B. For example, the transmit and receive buses (corresponding to the SDA bidirectional bus signals) generated by bidirectional signal separation circuitry 110A are provided to differential transceiver 120A, and the transmit and receive buses (corresponding to the SCL bidirectional bus signals) generated by bidirectional signal separation circuitry 110B are provided to differential transceiver 120B. Differential transceivers 120A and 120B may be implemented as controller area network transceivers (CAN transceivers) though any other suitable differential transceiver implementation can be used. The differential transceivers 120A and 120B convert the single-ended transmit signal (e.g., TXD), received from the respective bidirectional signal separation circuitry 110A and 110B, into a respective half-duplex differential bus 121 and 122 (COMB and COML) (e.g., CANH and CANL). The differential transceivers 120A and 120B also convert the half-duplex differential bus 121 and 122 into a receive signal (e.g., RXD) and send the receive signal to bidirectional signal separation circuitries 110A and 110B.

For example, when data is being transmitted out of the first device 150 (e.g., data is present on the TXD bus and not on the RXD bus), differential transceiver 120A converts the TXD bus signals into a differential signal bus 121 (COMH and COML). These differential signals can be communicated over greater distances than the bidirectional bus signals themselves (e.g., over 1.5 meters). In this way, the second device 160 may be at a distance greater than 1.5 meters from the first device 150 and may receive the bidirectional bus data of bidirectional bus 112 through the differential signal bus 121 transmitted by differential transceiver 120A using a corresponding differential transceiver 130A. Once the second device 160 receives the differential signal over bus 121 or 122 using differential transceiver 130A or 130B, the differential transceiver 130A or 130B converts the received signals into the unidirectional signal RXD. The data on the RXD bus is received by bidirectional signal separation circuitry 140A of the second device 160 and communicated on the SDA bidirectional bus 142 of the second device 160. The second device 160 may employ similar circuitry and functions to receive or transmit SCL bidirectional bus 144 signals through differential transceiver 130B and bidirectional signal separation circuitry 140B.

Figure 2:
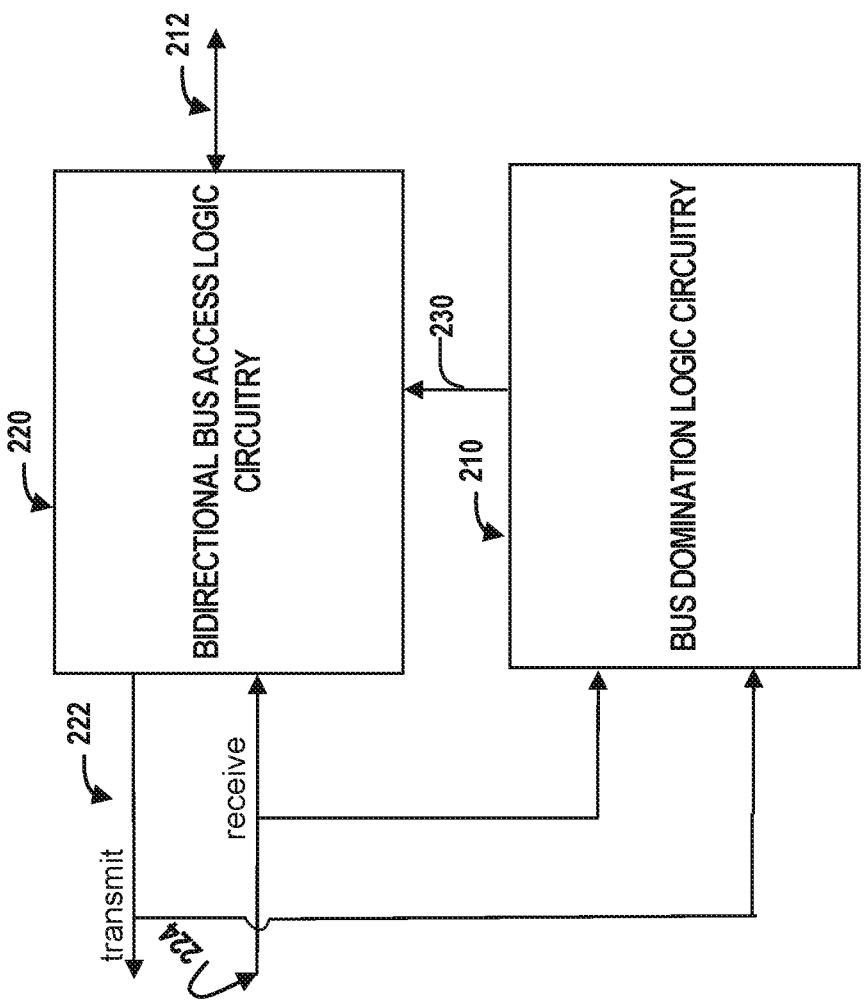
FIG. 2 is a block diagram of an example of a bidirectional signal separation device in accordance with various embodiments.

FIG. 2 is a block diagram of an example of a bidirectional signal separation device 200 in accordance with various embodiments. Bidirectional signal separation device 200 represents an implementation of bidirectional signal separation circuitries 110A, 110B, 140A, and 140B. Bidirectional signal separation device 200 includes bus domination logic circuitry 210 (e.g., first logic circuitry) and bidirectional bus access logic circuitry 220 (e.g., second logic circuitry). The bidirectional bus access logic circuitry 220 is coupled to a bidirectional bus 212 (e.g., bidirectional bus 112 (SDA)), a first unidirectional bus 222 (e.g., a TXD bus) and a second unidirectional bus 224 (e.g., an RXD bus). The bidirectional bus access logic circuitry 220 controls which of the two unidirectional buses 222 and 224 is allowed to communicate with the bidirectional bus 212 and which of the two unidirectional buses 222 and 224 is blocked from communicating with the bidirectional bus 212. The bidirectional bus access logic circuitry 220 performs this control based on an indication 230 received from bus domination logic circuitry 210 that informs bidirectional bus access logic circuitry 220 which of the two unidirectional buses 222 and 224 has become dominant first.

For example, bus domination logic circuitry 210 is coupled to the two unidirectional buses 222 and 224 and determines which one has become dominant first. Specifically, bus domination logic circuitry 210 includes logic that determines unidirectional bus 222 becomes dominant before unidirectional bus 224 when a signal on unidirectional bus 222 goes from a logic high state to a logic low state before a signal on the unidirectional bus 224 goes from a logic high state to a logic low state. Bus domination logic circuitry 210 may determine that unidirectional bus 222 communicates data in a particular direction (e.g., transmits data out of the device to an external device). In response to such a determination, bus domination logic circuitry 210 transmits a logic signal as indication 230 to bidirectional bus access logic circuitry 220 indicating which unidirectional bus 222 or 224 has become dominant first and the direction of communication (e.g., transmit versus receive). In response to receiving this indication 230, bidirectional bus access logic circuitry 220 allows unidirectional bus 222 to communicate with bidirectional bus 212 and blocks unidirectional bus 224 from communicating with the bidirectional bus 212.

In some implementations, bidirectional bus access logic circuitry 220 may block the unidirectional bus 224 from communicating with the bidirectional bus 212 by maintaining a logic value received from unidirectional bus 224 in a recessive state (e.g., by maintaining a logic high value in the signal received from unidirectional bus 224) regardless of whether the unidirectional bus 224 transitions to a dominant state or receives data from an external device. Bidirectional bus access logic circuitry 220 may block the unidirectional bus 222 from communicating with the bidirectional bus 212 in a similar manner. For example, bidirectional bus access logic circuitry 220 may maintain a logic value provided to the unidirectional bus 222 in a recessive state (e.g., by maintaining a logic high value in the signal provided to the unidirectional bus 222) regardless of whether the bidirectional bus 212 transitions to a dominant state.

For example, bidirectional bus access logic circuitry 220 may couple the unidirectional bus 224 to the bidirectional bus 212 through a logic NOR element. The logic NOR element has two inputs (a first input coupled to receive signals from the unidirectional bus 224 and a second input coupled to a blocking signal). The output of the logic NOR element is coupled to the bidirectional bus 212. To block the signals received from unidirectional bus 224 from communicating with the bidirectional bus 212, bidirectional bus access logic circuitry 220 maintains the blocking signal at logic high value which causes the output of the logic NOR element to be maintained at a logic low value regardless of changes in the unidirectional bus 224. This prevents the bidirectional bus 212 from receiving any signals from the unidirectional bus 224, thereby blocking communications between the unidirectional bus 224 and the bidirectional bus 212.

Bus domination logic circuitry 210 continues monitoring signals on the unidirectional buses 222 and 224. Bus domination logic circuitry 210 determines that the unidirectional bus 222 has transitioned from a dominant state to a recessive state. In response to this determination, bus domination logic circuitry 210 activates a timer circuit included in bus domination logic circuitry 210. After the timer circuit reaches a given threshold (e.g., 90 nanoseconds), bus domination logic circuitry 210 may transmit an indication 230 (e.g., an indication that includes two or more signals—TXDBLNK and RXDBLNK) to bidirectional bus access logic circuitry 220 that the unidirectional bus 222 has transitioned from a dominant state to a recessive state. In response to receiving this indication 230, bidirectional bus access logic circuitry 220 may stop blocking unidirectional bus 224 from communicating with the bidirectional bus 212. Specifically, bidirectional bus access logic circuitry 220 may allow both unidirectional buses 222 and 224 to communicate with the bidirectional bus 212.

Figure 3:
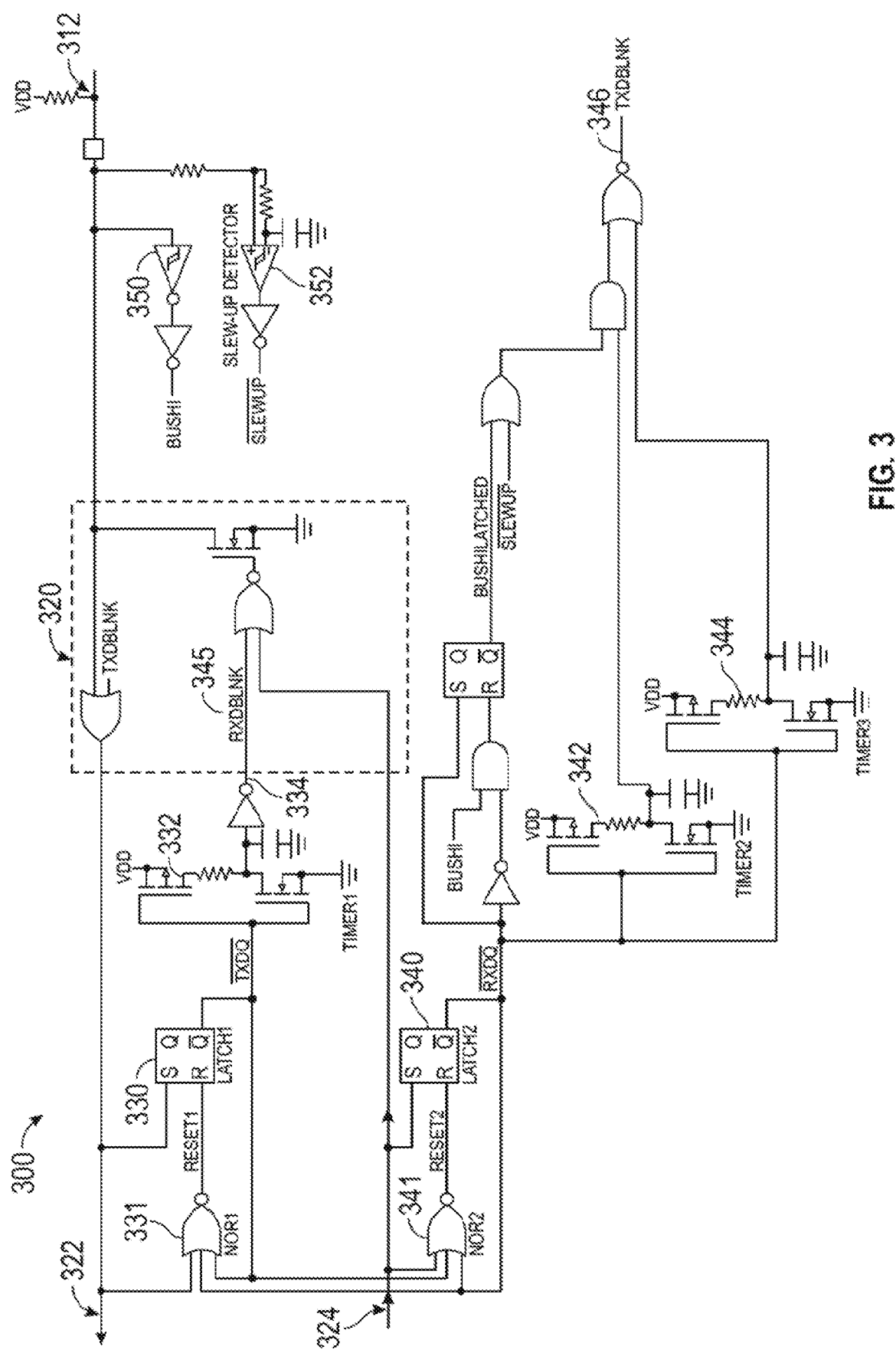
FIG. 3 is a block diagram of an example of various components of the bidirectional signal separation device in accordance with various embodiments.

FIG. 3 is a block diagram of an example of various components of the bidirectional signal separation device 300 in accordance with various embodiments. Bidirectional signal separation device 300 represents an implementation of bidirectional signal separation device 200 (FIG. 2). Specifically, bidirectional signal separation device 300 includes second logic circuitry 320 which represents an implementation of bidirectional bus access logic circuitry 220. The remaining logic circuitry outside of the second logic circuitry 320 corresponds to first logic circuitry, which represents bus domination logic circuitry 210. In some implementations, bidirectional bus access logic circuitry 220 and bus domination logic circuitry 210 may be combined into a single logic circuit.

Bidirectional signal separation device 300 includes a bidirectional bus 312 (e.g., an SDA or SCL bus), a first unidirectional bus 322 (e.g., a TXD bus), and a second unidirectional bus 324 (e.g., an RXD bus). In the most basic to ins, bidirectional signal separation device 300 waits for either the bidirectional bus 312 or the unidirectional receive signal (RXD) from second bus 324 to drive dominant (e.g., a logic low value) first to determine the direction of communication. Once the direction of communication is established by one bus becoming dominant (e.g., asserting a logic low value), its corresponding bus is asserted low and the opposing bus signal is blocked. The bus which communicates in the opposite direction continues being blocked until it is safe for the bus to communicate without locking up a bus or misinterpreting the direction of communication.

The logic elements (devices) NOR1 331, LATCH1 330, NOR2 341, and LATCH2 340 of bidirectional signal separation device 300 are responsible for establishing the direction of communication. At a default state, when the bidirectional bus 312 (e.g., SDA), unidirectional bus 324 (RXD), and unidirectional bus 322 (TXD) are unasserted (e.g., are in a logic high state) and no direction of communication is set, LATCH1 330 and LATCH2 340 are set and the signals /TXDQ and /RXDQ, output respectively by LATCH1 330 and LATCH2 340, are low.

If a device pulls the bidirectional bus 312 low first (e.g., the device implementing bidirectional signal separation device 300 is trying to transmit I2C data on the bidirectional bus 312 to an external device), the first unidirectional bus 322 becomes dominant (e.g., is asserted) while the second unidirectional bus 324 is recessive (e.g., is de-asserted). The state of NOR1 331 changes, which causes LATCH1 330 to reset, which drives /TXDQ high. At this point the direction of communication is established in the direction from the bidirectional bus 312 to the differential bus via the first unidirectional bus 322. The blanking signal RXDBLNK 345 becomes a logic high value which blocks the second unidirectional bus 324 from driving the bidirectional bus 312. When the bidirectional bus 312 is eventually released by the device which is transmitting data on the bidirectional bus 312 and returns to a recessive state, the first unidirectional bus 322 becomes recessive (e.g., is deasserted) and LATCH1 330 is set. This changes /TXDQ back to a low logic state, which starts timer circuit TIMER1 332. RXDBLNK 345 remains high until timer circuit TIMER1 332 reaches a given threshold (e.g., 90 nanoseconds) at which point RXDBLNK 345 returns to a logic low value, which allows communication in either direction (e.g., allows either the first unidirectional bus 322 or the second unidirectional bus 324 to communicate with the bidirectional bus 312). In some implementations, the duration of timer circuit TIMER1 332 is set to a value that exceeds the sum of the differential-bus relaxation time and the propagation delay of the differential bus to a pin corresponding to the second unidirectional bus 324. In this way, timer circuit TIMER1 332 prevents the second unidirectional bus 324 from driving the bidirectional bus 312 as the result of an external device driving its own bidirectional bus corresponding to the bidirectional bus 312.

When the second unidirectional bus 324 becomes dominant (e.g., is asserted) while the first unidirectional bus 322 remains recessive (e.g., is de-asserted), NOR2 341 changes state. This causes LATCH2 340 to reset and drive /RXDQ high. At this point, communication is established in the direction from the differential bus 121 to the bidirectional bus 312. The blanking signal TXDBLNK 346 prevents the bidirectional bus 312 from driving differential bus 121 by sending data to the first unidirectional bus 322. When the second unidirectional bus 324 returns to a recessive state, LATCH2 340 is set, which changes /RXDQ back to low. This causes timer circuit TIMER2 342 and timer circuit TIMERS 344 to start. TXDBLNK 346 remains high and can continue blocking the first unidirectional bus 322 until one of three conditions is met.

In one case, TXDBLNK 346 may change state and become low thereby allowing communication between the first unidirectional bus 322 and the bidirectional bus 312 when timer circuit TIMER2 342 reaches a first threshold (e.g., 30 nanoseconds) and the bidirectional bus 312 has returned to a recessive state. The bidirectional bus 312 returning to a recessive state may be detected when the logic element 350 goes high. In this case, the signal BUSH- ILATCHED goes high, which sets TXDBLNK 346 back low. At this point, any assertion of the bidirectional bus 312 can safely be assumed to be the result of data being transmitted to the first unidirectional bus 322. Communication can once again flow in either direction.

In another case, TXDBLNK 346 may change state and become low thereby allowing communication between the first unidirectional bus 322 and the bidirectional bus 312 when timer circuit TIMER2 342 reaches the first threshold and the bidirectional bus 312 is not slewing towards a recessive state. Slew detector 352 determines whether the bidirectional bus 312 is slewing towards the recessive state and generates the /SLEWUP signal. When the /SLEWUP signal goes high (after timer circuit TIMER2 342 reaches the first threshold) TXDBLNK 346 is set back to a logic low value. At this point, the bidirectional bus 312 can be assumed as being asserted as a result of data being transmitted to the first unidirectional bus 322. This data can now safely be communicated to the differential bus 121. In some implementations, the first threshold (e.g., the duration) of timer circuit TIMER2 342 is set to exceed the detection time of the slew detector 352 at the slowest slew-rate allowed on the pin corresponding to the bidirectional bus 312. This restriction on the value of the first threshold of timer circuit TIMER2 342 may guarantee that first unidirectional bus 322 will not be asserted as the result of data received from the differential bus 121 from an external device.

In another case, TXDBLNK 346 may change state and become low thereby allowing communication between the first unidirectional bus 322 and the bidirectional bus 312 when timer circuit TIMER3 344 reaches a second threshold (e.g., 120 nanoseconds) and neither of the previous conditions has been met. In this case, TXDBLNK 346 returns to a low state, opening communication in either direction. The second threshold of timer circuit TIMER3 344 may be longer than the first threshold of timer circuit TIMER2 342 and simply ensures that bidirectional communication will eventually open back up even if the bidirectional bus 312 remains in a dominant state (e.g., a logic low state) but slewing up slowly. In some implementations, the duration of the second threshold of timer circuit TIMER3 344 is set to exceed the maximum allowable rise time of the bidirectional bus 312. This restriction on the value of the second threshold of timer circuit TIMER3 344 prevents the first unidirectional bus 322 from being asserted as the result of any data received on the differential bus, and may guarantee that bidirectional communication is not stuck in a latch state and will resume after sufficient time has passed that bidirectional bus 312 would have returned to a recessive state as the result of the second unidirectional bus 324 becoming recessive (e.g., de-asserting).

The timer circuits TIMER1 332, TIMER2 342, and TIMER3 344 are depicted in FIG. 3 as being implemented using a pair of transistors coupled to a resistor and a capacitor. The duration or threshold of each of these timer circuits 332, 342 and 344 is set based on the ratio of their respective resistors and capacitors. Any other suitable timer circuit may be implemented that utilizes or does not utilize transistors, resistors, and capacitors. For example, a timer circuit may be implemented in logic using a collection of logic delay elements coupled in series or a collection of counter circuits set to one or more values.

Figure 4:
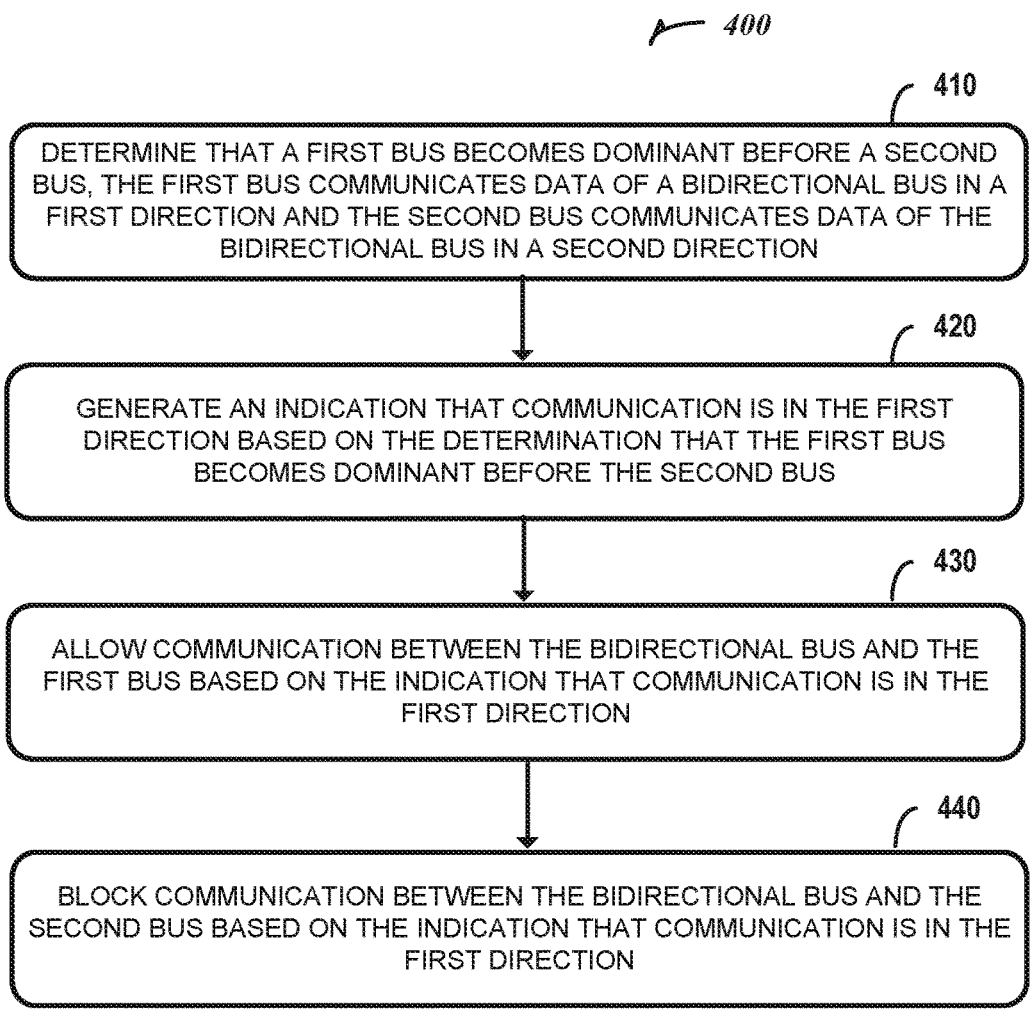
FIGS. 4-6 are flow diagrams depicting example processes for performing bidirectional signal separation in accordance with various embodiments.

FIG. 4 is a flow diagram depicting an example process 400 for converting a bidirectional signal into first and second buses in accordance with various embodiments. The operations of process 400 may be performed in parallel, in a different sequence, or may be entirely omitted. In some embodiments, some or all of the operations of process 400 may be embodied on a computer-readable medium and executed by one or more processors.

At operation 410, a determination is made that a first bus becomes dominant before a second bus, the first bus communicates data of a bidirectional bus in a first direction and the second bus communicates data of the bidirectional bus in a second direction. For example, bus domination logic circuitry 210 may determine that unidirectional bus 222 (first bus) has become dominant before unidirectional bus 224 (second bus). Alternatively, bus domination logic circuitry 210 may determine that unidirectional bus 224 (first bus) has become dominant before unidirectional bus 222 (second bus).

At operation 420, an indication that communication is in the first direction is generated based on the determination that the first bus becomes dominant before the second bus. For example, bus domination logic circuitry 210 may generate an indication 230 and provide this indication 230 to bidirectional bus access logic circuitry 220 indicating the direction of communication. For example, bus domination logic circuitry 210 may indicate that communication is in the transmit direction or in the receive direction.

At operation 430, communication between the bidirectional bus and the first bus is allowed based on the indication that the communication is in the first direction. For example, bidirectional bus access logic circuitry 220 may allow communication between the bidirectional bus 212 and the unidirectional bus 222 when direction of communication is in the transmit direction. Alternatively, bidirectional bus access logic circuitry 220 may allow communication between the bidirectional bus 212 and the unidirectional bus 224 when direction of communication is in the receive direction.

At operation 440, communication between the bidirectional bus and the second bus is blocked based on the indication that the communication is in the first direction. For example, bidirectional bus access logic circuitry 220 may block communication between the bidirectional bus 212 and the unidirectional bus 224 when direction of communication is in the transmit direction. Alternatively, bidirectional bus access logic circuitry 220 may block communication between the bidirectional bus 212 and the unidirectional bus 222 when direction of communication is in the receive direction.

Figure 5:
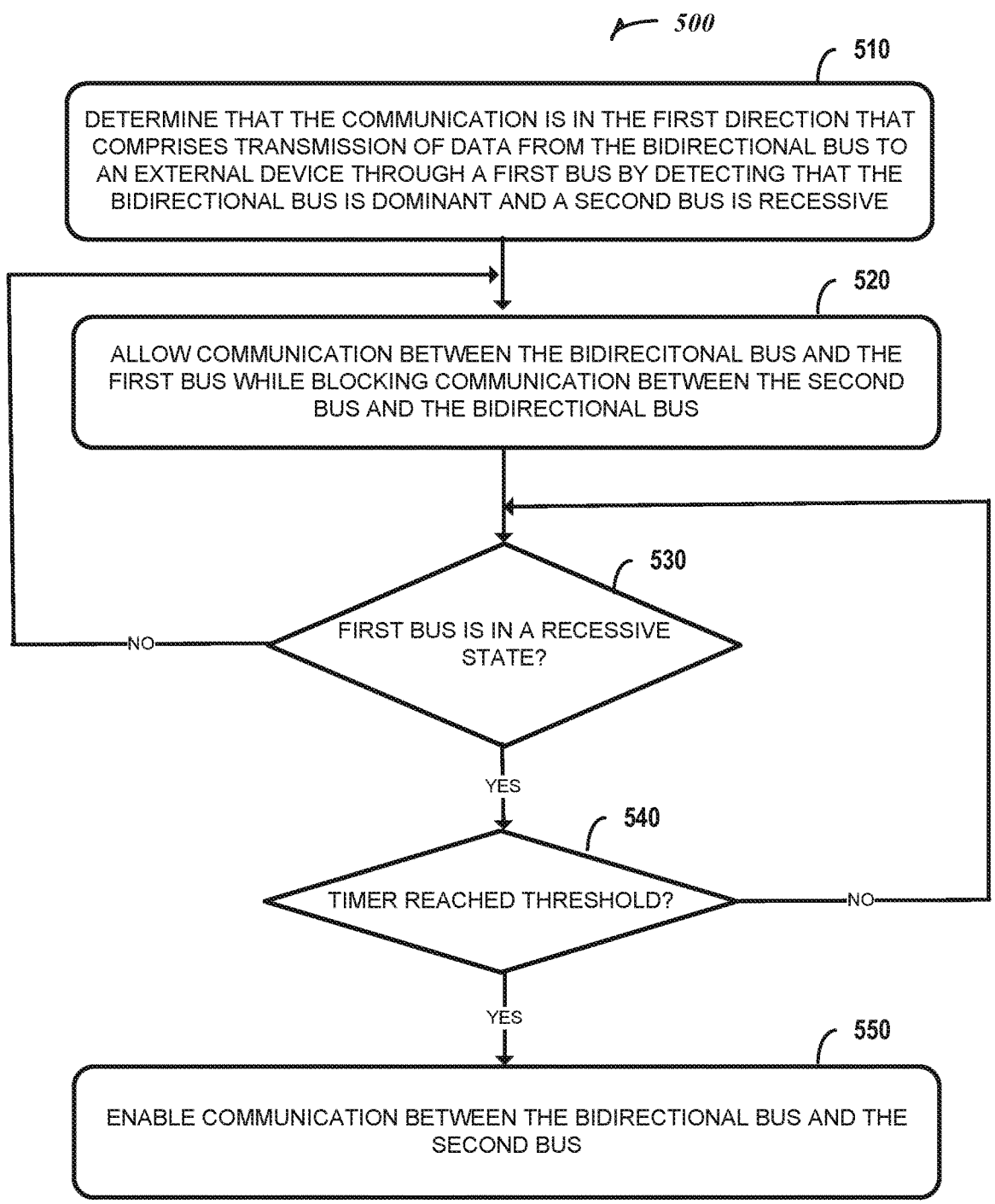

FIG. 5 is a flow diagram depicting an example process 500 for splitting a bidirectional signal into first and second buses in accordance with various embodiments. The operations of process 500 may be performed in parallel, in a different sequence, or may be entirely omitted. In some embodiments, some or all of the operations of process 500 may be embodied on a computer-readable medium and executed by one or more processors.

At operation 510, a determination is made that the communication is in the first direction that comprises transmission of data from the bidirectional bus to an external device through a first bus by detecting that the bidirectional bus is dominant and a second bus is recessive. For example, NOR1 331 and NOR2 341 determine which of the first and second unidirectional buses 322 and 324 has become dominant first to determine the direction of communication.

At operation 520, communication between the bidirectional bus and the first bus is allowed while blocking communication between the second bus and the bidirectional bus. For example, when NOR1 331 changes to a high logic state before NOR2 341, the direction of communication is determined to be in the transmit direction (e.g., from bidirectional bus 312 to first unidirectional bus 322). In this case, logic circuitry 320 allows communication from the bidirectional bus 312 to the first unidirectional bus 322, and based on the RXDBLNK 345 signal and a NOR logic element, blocks communication from the second unidirectional bus 324 to the bidirectional bus 312.

At operation 530, a determination is made as to whether the first bus is in a recessive state. In response to determining that the first bus is in the recessive state, the process proceeds to operation 540; otherwise the process proceeds to operation 520. For example, LATCH1 330 determines that the first unidirectional bus 322 is in a recessive state.

At operation 540, a determination is made as to whether the timer reached a threshold. In response to determining that the timer reached the threshold, the process proceeds to operation 550; otherwise the process proceeds to operation 530. For example, when timer circuit TIMER1 332 reaches a given threshold, a value output by timer circuit TIMER' 332 changes, resulting in a logic state change to RXDBLNK 345 signal. This indicates a determination that the timer reached a threshold.

At operation 550, communication between the bidirectional bus and the second bus is enabled. For example, RXDBLNK 345 changes state to a logic low value. Both RXDBLNK 345 and TXDBLNK 346 being at a logic low states cause logic circuitry 320 to allow communication between the bidirectional bus and the first and second unidirectional buses 322 and 324.

Figure 6:
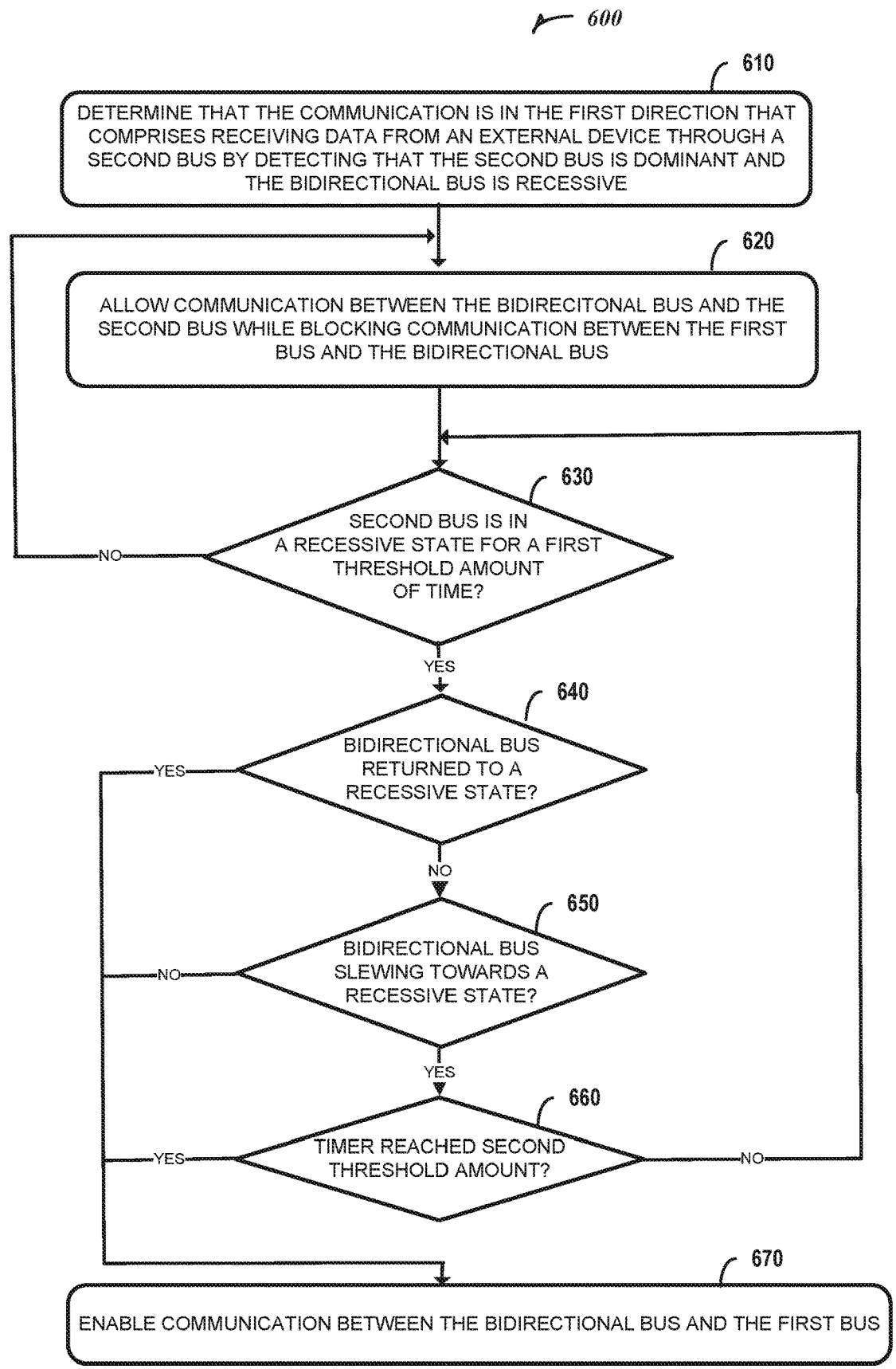

FIG. 6 is a flow diagram depicting an example process 600 for splitting a bidirectional signal into first and second buses, in accordance with various embodiments. The operations of process 600 may be performed in parallel, in a different sequence, or may be entirely omitted. In some embodiments, some or all of the operations of process 600 may be embodied on a computer-readable medium and executed by one or more processors.

At operation 610, a determination is made that the communication is in the first direction that comprises receiving data from an external device through a second bus by detecting that the second bus is dominant and the bidirectional bus is recessive. For example, NOR' 331 and NOR2 341 determine which of the first and second unidirectional buses 322 and 324 has become dominant first to determine the direction of communication.

At operation 620, communication between the bidirectional bus and the second bus is allowed while blocking communication between the first bus and the bidirectional bus. For example, when NOR2 341 changes to a high logic state before NOR1 331, the direction of communication is determined to be in the receive direction (e.g., from the second unidirectional bus 324 to bidirectional bus 312). In this case, logic circuitry 320 allows communication between the bidirectional bus 312 and the second unidirectional bus 324, and based on the TXDBLNK 346 signal and an OR logic element, blocks communication from the bidirectional bus 312 to the first unidirectional bus 322.

At operation 630, a determination is made as to whether the second bus is in a recessive state for a first threshold amount of time. In response to determining the second bus is in a recessive state for a first threshold amount of time, the process 600 proceeds to operation 640; otherwise the process 600 proceeds to operation 620. For example, when timer circuit TIMER2 342 reaches the first threshold, a value output by timer circuit TIMER2 342 changes, resulting in a logic state change to a logic element that generates TXD-BLNK 346 signal. This indicates a determination that the timer reached the first threshold.

At operation 640, a determination is made as to whether the bidirectional bus returned to a recessive state. In response to determining the bidirectional bus returned to the recessive state, the process 600 proceeds to operation 670; otherwise the process 600 proceeds to operation 650. For example, logic element 350 determines whether the bidirectional bus 312 returned to a recessive state when it outputs a high logic value.

At operation 650, a determination is made as to whether the bidirectional bus is slewing towards a recessive state. In response to determining the bidirectional bus is slewing towards the recessive state, the process 600 proceeds to operation 660; otherwise the process 600 proceeds to operation 670. For example, slew detector 352 determines whether the bidirectional bus 312 is stewing towards a recessive state.

At operation 660, a determination is made as to whether a timer reached a second threshold amount. In response to determining the timer reached the second threshold amount, the process 600 proceeds to operation 670; otherwise the process 600 proceeds to operation 630. For example, when timer circuit TIMER3 344 reaches the second threshold, a value output by timer circuit TIMER3 344 changes, resulting in a logic state change to the logic element that generates the TXDBLNK 346 signal. This indicates a determination that the timer reached the second threshold.

At operation 670, communication between the bidirectional bus and the first bus is enabled. For example, TXD-BLNK 346 changes state, which causes logic circuitry 320 to allow communication between the bidirectional bus and the first and second unidirectional buses 322 and 324.

Figure 7:
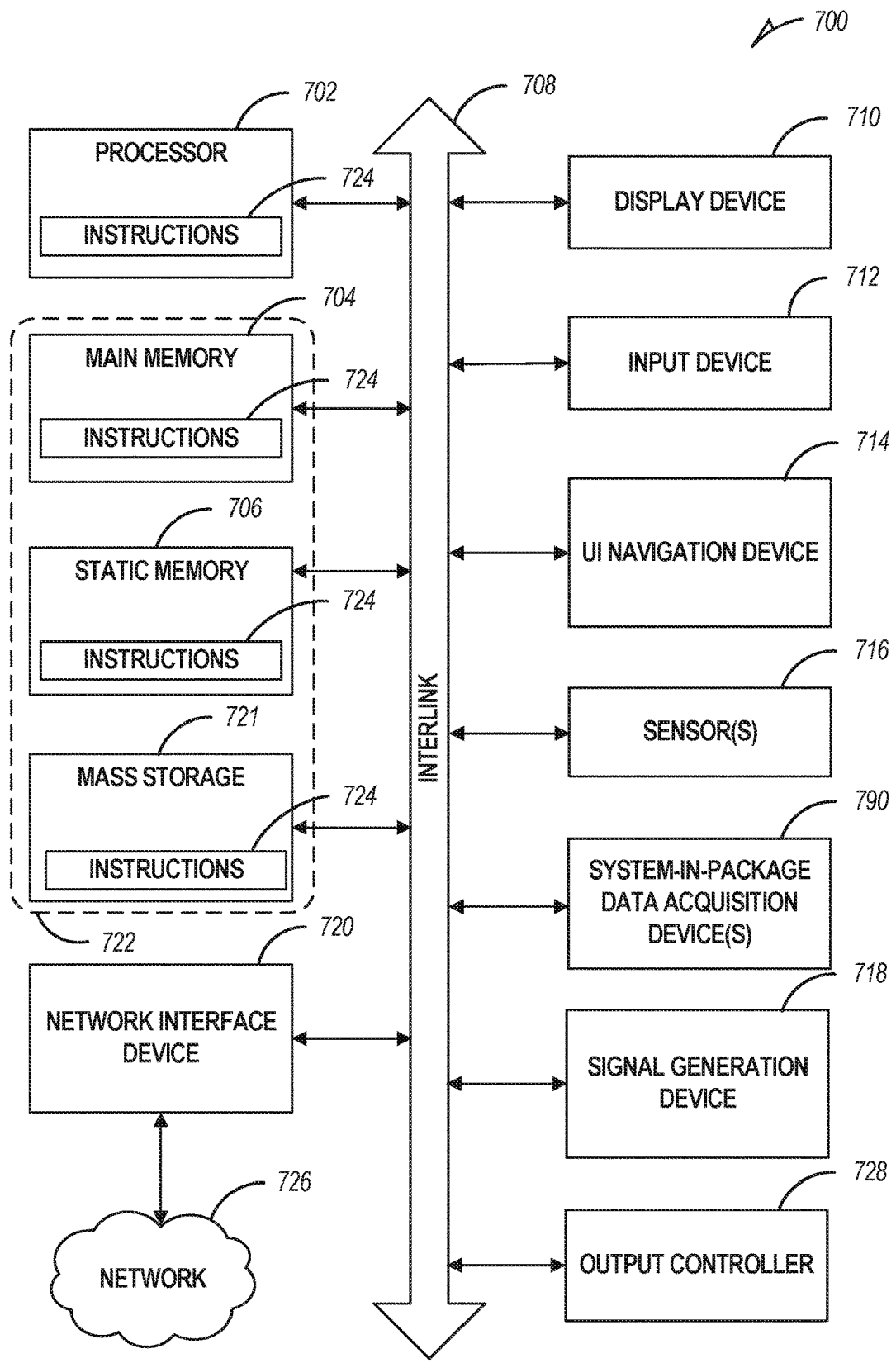
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, an IoT device, automotive system, an aerospace system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 700 may include a hardware processor 702 (e.g., a central processing unit (CPU), a graphics processing unit (GPU), a hardware processor core, or any combination thereof, such as a memory controller, etc.), a main memory 704, and a static memory 706, some or all of which may communicate with each other via an interlink (e.g., bus) 708. The machine 700 may further include a display device 710, an alphanumeric input device 712 (e.g., a keyboard), and a user interface (UI) navigation device 714 (e.g., a mouse). In an example, the display device 710, input device 712, and UI navigation device 714 may be a touch screen display. The machine 700 may additionally include a storage device 722 (e.g., drive unit), a signal generation device 718 (e.g., a speaker), a network interface device 720, one or more sensors 716, such as a global positioning system (GPS) sensor, wing sensors, mechanical device sensors, temperature sensors, ICP sensors, bridge sensors, audio sensors, industrial sensors, compass, accelerometer, or other sensor, and one or more system-in-package data acquisition device(s) 790. System-in-package data acquisition device(s) 790 may implement some or all of the functionality of system-in-package data acquisition device(s) 100. The machine 700 may include an output controller 728, such as a serial (e.g., universal serial bus (USB), parallel, or other wired or wireless (e.g., infrared (IR), near field communication (NFC), etc. connection to communicate or control one or more peripheral devices (e.g., a printer, card reader, etc.).

The storage device 722 may include a machine-readable medium on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 721 may constitute the machine-readable medium 722.

While the machine-readable medium 722 is illustrated as a single medium, the term "machine-readable medium" may include a single medium or multiple media (e.g., a centralized or distributed database, or associated caches and servers) configured to store the one or more instructions 724.

The term "machine readable medium" may include any transitory or non-transitory medium that is capable of storing, encoding, or carrying transitory or non-transitory instructions for execution by the machine 700 and that cause the machine 700 to perform any one or more of the techniques of the present disclosure, or that is capable of storing, encoding or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 (e.g., software, programs, an operating system (OS), etc.) or other data that are stored on the storage device 721 can be accessed by the memory 704 for use by the processor 702. The memory 704 (e.g., DRAM) is typically fast, but volatile, and thus a different type of storage than the storage device 721 (e.g., an SSD), which is suitable for long-term storage, including while in an "off" condition. The instructions 724 or data in use by a user or the machine 700 are typically loaded in the memory 704 for use by the processor 702. When the memory 704 is full, virtual space from the storage device 721 can be allocated to supplement the memory 704; however, because the storage device 721 is typically slower than the memory 704, and write speeds are typically at least twice as slow as read speeds, use of virtual memory can greatly reduce user experience due to storage device latency (in contrast to the memory 704, e.g., DRAM). Further, use of the storage device 721 for virtual memory can greatly reduce the usable lifespan of the storage device 721.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®). IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any tangible or intangible medium that is capable of storing, encoding or carrying instructions for execution by the machine 700, and includes digital or analog communications signals or other tangible or intangible medium to facilitate communication of such software.

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the inventive subject matter may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with transitory or non-transitory instructions operable to configure an electronic device to perform methods as described in the above examples. An implementation of such methods may include code, such as microcode, assembly language code, a higher-level language code, or the like. Such code may include transitory or non-transitory computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the inventive subject matter should be determined with reference to the appended claims, along with the full scope of equivalents to which such claims are entitled.

The claimed invention is:

1. A system for converting a bidirectional bus to two unidirectional buses comprising a first bus that communicates data in a first direction and a second bus that communicates data in a second direction, the system comprising:
   first logic circuitry coupled to the first and second buses and configured to:
      determine which one of the first bus and the second bus becomes dominant first;
      generate a first indication that communication is in the first direction based on the determination that the first bus becomes dominant first before the second bus;
      generate a second indication that communication is in the second direction based on the determination that the second bus becomes dominant first before the first bus; and
   second logic circuitry, responsive to the first logic circuitry, being coupled to the bidirectional bus and configured to:
      manage respective communication between the first and second busses and the bidirectional bus based on the determination of which one of the first and second busses becomes dominant first, wherein communication is allowed between the bidirectional bus and the first bus and is blocked between the bidirectional bus and the second bus based on the first indication that communication is in the first direction, and wherein communication is allowed between the bidirectional bus and the second bus and is blocked between the bidirectional bus and the first bus based on the second indication that communication is in the second direction; and
      allow both the first bus and the second bus to communicate with the bidirectional bus in response to the first bus transitioning from a dominant state to a recessive state.

2. The system of claim 1, wherein the first logic circuitry is further configured to trigger a change in the first indication that communication is in the first direction when the first bus becomes recessive for a specified period of time, and wherein the second logic circuitry allows both the first bus and the second bus to communicate with the bidirectional bus asynchronously.

3. The system of claim 1, wherein the first logic circuitry comprises a timer circuit coupled to a logic element for generating the first indication that communication is in the first direction, wherein the first bus is configured to transmit the data to an external device, and wherein the second bus is configured to receive the data from the external device.

4. The system of claim 3, wherein the timer circuit is configured to:
assert a signal that indicates that communication is in the first direction in response to detecting that the first bus becomes dominant; and
delay clearing the signal in response to detecting that the first bus becomes recessive until the timer circuit reaches a specified value.

5. The system of claim 1, wherein the first bus is configured to receive the data from an external device, wherein the second bus is configured to transmit the data to the external device, and wherein the first logic circuitry comprises first and second timer circuits coupled to a plurality of logic elements for generating the first indication that communication is in the first direction.

6. The system of claim 5, wherein the first and second timer circuits receive an indication that the first bus has become recessive, wherein the plurality of logic elements is coupled to the bidirectional bus, and wherein the plurality of logic elements is configured to:
determine that the bidirectional bus has become recessive;
determine that the bidirectional bus is slewing towards a recessive state; and
generate an indication that the first bus has become recessive.

7. The system of claim 6, wherein the plurality of logic elements is configured to trigger a change in the first indication that communication is in the first direction based on determining that at least one of:
the first timer circuit reaches a first specified value and the bidirectional bus becomes recessive;
the first timer circuit reaches the first specified value and the bidirectional bus is determined to not be slewing towards the recessive state; or
the second timer circuit reaches a second specified value greater than the first specified value.

8. The system of claim 1, wherein the second logic circuitry blocks the communication between the bidirectional bus and the second bus by maintaining a value communicated on the second bus in an asserted state, and wherein the first logic circuitry comprises a first latch having a first input coupled to the first bus and a second latch having a first input coupled to the second bus, an output of the second latch being coupled to a second input of the first latch via a first NOR logic element, an output of the first latch being coupled to a second input of the second latch via a second NOR logic element, the first latch output generates the first indication that communication is in the first direction and the second latch output generates the second indication that communication is in the second direction.

9. The system of claim 1, wherein:
the first logic circuitry is configured to determine that the first bus becomes dominant when a logic value of the first bus becomes low;
the first logic circuitry comprises a first NOR logic element having inputs coupled directly to the first bus, an output of a first latch and an output of a second latch, an input of the first latch being coupled to the first bus;
the first NOR logic element has an output coupled to the first latch, an output of the first latch being coupled to the second logic circuitry via at least a timer circuit; and
the first latch output generates the first indication that communication is in the first direction.

10. The system of claim 9, wherein:
the first logic circuitry comprises a second NOR logic element having inputs coupled directly to the second bus, an output of the first latch, and an output of the second latch, an input of the second latch being coupled to the second bus;
the second NOR logic element has an output coupled to the second latch, an output of the second latch being coupled to the second logic circuitry via at least an additional timer circuit;
the second logic circuitry comprises a first OR logic element and a third NOR logic element;
the first OR logic element having inputs coupled to the bidirectional bus and to the first indication generated by the first logic circuitry, an output of the first OR logic element being coupled to the first bus; and
the third NOR logic element having inputs coupled to the second bus and to the first indication generated by the first logic circuitry, an output of the third NOR logic element being coupled via a transistor to the bidirectional bus.

11. A method for converting a bidirectional bus to two unidirectional buses comprising a first bus that communicates data in a first direction and a second bus that communicates data in a second direction, the method comprising:
determining which one of the first bus and the second bus becomes dominant first;
generating a first indication that communication is in the first direction based on the determination that the first bus becomes dominant first before the second bus;
generating a second indication that communication is in the second direction based on the determination that the second bus becomes dominant first before the first bus;
managing respective communication between the first and second busses and the bidirectional bus based on the determination of which one of the first and second busses becomes dominant first, wherein communication is allowed between the bidirectional bus and the first bus and is blocked between the bidirectional bus and the second bus based on the first indication that communication is in the first direction, and wherein communication is allowed between the bidirectional bus and the second bus and is blocked between the bidirectional bus and the first bus based on the second indication that communication is in the second direction; and
allow both the first bus and the second bus to communicate with the bidirectional bus in response to the first bus transitioning from a dominant state to a recessive state.

12. The method of claim 11, further comprising triggering a change in the first indication that communication is in the first direction when the first bus becomes recessive for a specified period of time, wherein the first bus and the second bus are allowed to communicate with the bidirectional bus asynchronously.

13. The method of claim 11, wherein the determination that the first bus becomes dominant before the second bus is performed using a timer circuit coupled to a logic element, wherein the first bus is configured to transmit the data to an external device, and wherein the second bus is configured to receive the data from the external device.

14. The method of claim 13, wherein the timer circuit is configured to:
assert a signal that indicates that communication is in the first direction in response to detecting that the first bus becomes dominant; and
delay clearing the signal in response to detecting that the first bus becomes recessive until the timer circuit reaches a specified value.

15. The method of claim 11, wherein the first bus is configured to receive the data from an external device, wherein the second bus is configured to transmit the data to the external device, and wherein the determining and generating steps are performed using first and second timer circuits coupled to a plurality of logic elements.

16. The method of claim 11, further comprising blocking the communication between the bidirectional bus and the second bus by maintaining a value communicated on the second bus in an asserted state, wherein the first and second indications are generated by first logic circuitry that comprises a first latch having a first input coupled to the first bus and a second latch having a first input coupled to the second bus, an output of the second latch being coupled to a second input of the first latch via a first NOR logic element, an output of the first latch being coupled to a second input of the second latch via a second NOR logic element.

17. The method of claim 11 further comprising:
    determining, using first logic circuitry, that the first bus becomes dominant when a logic value of the first bus becomes low; wherein:
    the first logic circuitry comprises a first NOR logic element having inputs coupled directly to the first bus, an output of a first latch and an output of a second latch, an input of the first latch being coupled to the first bus;
    the first NOR logic element has an output coupled to the first latch, an output of the first latch being coupled to the second logic circuitry via at least a timer circuit;
    the first latch output generates the first indication that communication is in the first direction;
    the first logic circuitry comprises a second NOR logic element having inputs coupled directly to the second bus, an output of the first latch, and an output of the second latch, an input of the second latch being coupled to the second bus;
    the second NOR logic element has an output coupled to the second latch, an output of the second latch being coupled to the second logic circuitry via at least an additional timer circuit;
    the second logic circuitry comprises a first OR logic element and a third NOR logic element;
    the first OR logic element having inputs coupled to the bidirectional bus and to the first indication generated by the first logic circuitry, an output of the first OR logic element being coupled to the first bus; and
    the third NOR logic element having inputs coupled to the second bus and to the first indication generated by the first logic circuitry, an output of the third NOR logic element being coupled via a transistor to the bidirectional bus.

18. A system for enabling differential signal communication for a device that uses a bidirectional bus, the system comprising:
    a bidirectional signal separation device configured to convert the bidirectional bus to two unidirectional buses comprising a first bus that communicates data in a first direction and a second bus that communicates data in a second direction, wherein the bidirectional signal separation device comprises logic circuitry configured to:
        determine which one of the first bus and the second bus becomes dominant first;
        generate a first indication that communication is in the first direction based on the determination that the first bus becomes dominant first before the second bus;
        generate a second indication that communication is in the second direction based on the determination that the second bus becomes dominant first before the first bus;
        manage respective communication between the first and second busses and the bidirectional bus based on the determination of which one of the first and second busses becomes dominant first, wherein communication is allowed between the bidirectional bus and the first bus and is blocked between the bidirectional bus and the second bus based on the first indication that communication is in the first direction, and wherein communication is allowed between the bidirectional bus and the second bus and is blocked between the bidirectional bus and the first bus based on the second indication that communication is in the second direction; and
        allow both the first bus and the second bus to communicate with the bidirectional bus in response to the first bus transitioning from a dominant state to a recessive state; and
    a differential signal transceiver coupled to the first and second buses provided by the bidirectional signal separation device for communicating data to and from the device over a differential signal pair.

19. The system of claim 18, wherein the logic circuitry allows both the first bus and the second bus to communicate with the bidirectional bus asynchronously.

20. The system of claim 18, wherein the logic circuitry comprises a first latch having a first input coupled to the first bus and a second latch having a first input coupled to the second bus, an output of the second latch being coupled to a second input of the first latch via a first NOR logic element, an output of the first latch being coupled to a second input of the second latch via a second NOR logic element, the first latch output generates the first indication that communication is in the first direction and the second latch output generates the second indication that communication is in the second direction.

* * * * *